US011491653B2

(12) United States Patent
He et al.

(10) Patent No.: US 11,491,653 B2
(45) Date of Patent: Nov. 8, 2022

(54) METHOD AND APPARATUS FOR ROBOTIC MACHINING (71) Applicant: ABB Schweiz AG, Baden (CH)

(72) Inventors: Haifei He, Shanghai (CN); Lei Mao, Shanghai (CN); Liyu Wang, Shanghai (CN)

(73) Assignee: ABB SCHWEIZ AG, Baden (CH)

( * ) Notice: Subject to any disclaimer, the term of this patent is extended or adjusted under 35 U.S.C. 154(b) by 180 days.

(21) Appl. No.: 16/884,438

(22) Filed: May 27, 2020

(65) Prior Publication Data
US 2020/0282559 A1 Sep. 10, 2020

Related U.S. Application Data (63) Continuation of application No. PCT/CN2017/118663, filed on Dec. 26, 2017.

(51) Int. Cl.
B25J 9/16 (2006.01)
B25J 11/00 (2006.01)
B25J 13/08 (2006.01)

(52) U.S. Cl.
CPC ......... B25J 9/1664 (2013.01); B25J 11/0065 (2013.01); B25J 13/085 (2013.01)

(58) Field of Classification Search
CPC .... B25J 9/1664; B25J 11/0065; B25J 13/085; B24B 1/00; B24B 49/00; B24B 49/16; B24B 27/0038
USPC .................. 700/245–264; 318/568.11–568.25
See application file for complete search history.

(56) References Cited

U.S. PATENT DOCUMENTS 5,282,143 A 1/1994 Shirai et al.
5,495,410 A * 2/1996 Graf ...................... B25J 9/1671
700/86
5,668,453 A * 9/1997 Muto ..................... B25J 9/1679
700/262

(Continued)

FOREIGN PATENT DOCUMENTS

CN 102689238 A 9/2012
CN 104766333 A 7/2015

(Continued)

OTHER PUBLICATIONS

State Intellectual Property Office of the P.R. China, International Search Report & Written Opinion issued in corresponding Application No. PCT/CN2017/118663, dated Sep. 21, 2018, 10 pp.

(Continued)

Primary Examiner — Jaime Figueroa
(74) Attorney, Agent, or Firm — Greenberg Traurig, LLP (57) ABSTRACT A method for robotic machining is disclosed. The method includes determining a first designed machining path based on a modelled surface for a target surface to be machined. The method also includes causing a robot to machine the target surface based on the first designed machining path in an adaptive manner to obtain an actual machining path, wherein where the modelled surface is different from the target surface, the robot is caused to follow the target surface. The method further includes determining a second designed machining path for the target surface based on the actual machining path and the first designed machining path.

20 Claims, 4 Drawing Sheets

(56) References Cited

U.S. PATENT DOCUMENTS

| | | | |
|---|---|---|---|
| 6,812,665 B2* | 11/2004 | Gan | B25J 9/1692 318/568.17 |
| 6,836,702 B1* | 12/2004 | Brogårdh et al. | B25J 9/1664 700/262 |
| 7,130,718 B2* | 10/2006 | Gunnarsson | B25J 9/1641 700/250 |
| 7,209,801 B2* | 4/2007 | Anfindsen | G05B 19/425 700/264 |
| 7,241,200 B2* | 7/2007 | Kalanovic | B24B 27/0023 451/10 |
| 9,186,795 B1 | 11/2015 | Edsinger et al. | |
| 10,131,033 B2* | 11/2018 | Maloney | B24B 29/00 |
| 10,611,024 B2* | 4/2020 | Skogsrud | B25J 9/1664 |
| 11,202,682 B2* | 12/2021 | Staunton | A61B 34/76 |
| 2004/0254677 A1* | 12/2004 | Brogardh | G05B 19/4083 700/250 |
| 2006/0217037 A1* | 9/2006 | Kalanovic | B24B 51/00 451/5 |
| 2007/0046677 A1* | 3/2007 | Hong | G05B 19/41 345/442 |
| 2014/0114463 A1* | 4/2014 | Shilpiekandula | G05B 19/19 700/173 |
| 2014/0235141 A1 | 8/2014 | Maloney et al. | |
| 2016/0089789 A1 | 3/2016 | Sato | |
| 2019/0126474 A1* | 5/2019 | Skogsrud | B25J 9/1664 |
| 2020/0218223 A1* | 7/2020 | Reekmans | G05B 19/4083 |

FOREIGN PATENT DOCUMENTS

| | | |
|---|---|---|
| CN | 105458878 A | 4/2016 |
| CN | 104552293 B | 7/2016 |
| CN | 106881648 A | 6/2017 |
| CN | 107052950 A | 8/2017 |
| DE | 102015012314 A1 | 3/2016 |
| WO | 2006093652 A2 | 9/2006 |
| WO | 2010003289 A1 | 1/2010 |
| WO | 2014061395 A1 | 4/2014 |

OTHER PUBLICATIONS

China First Office Action and Search Report, issued by the Chinese Patent Office, regarding corresponding patent application Serial No. 2017800979875; dated Jun. 28, 2021; 8 pages (4 pages English translation).

European Search Report and Opinion, dated Jul. 5, 2021, from related European Patent Application No. 17936648.9.

China Second Office Action, issued by the National Intellectual Property Administration, regarding corresponding patent application Serial No. CN 201780097987.5; dated Feb. 22, 2022; 13 pages (with English Translation).

Decision to Grant; issued by the China National Intellectual Property Administration, regarding corresponding patent application Serial No. CN 201780097987.5; dated Jul. 6, 2022; 6 pages (with English translation).

* cited by examiner

METHOD AND APPARATUS FOR ROBOTIC MACHINING

TECHNICAL FIELD

Example embodiments of the present disclosure generally relate to industrial robots, and more particularly to a method and an apparatus for robotic machining.

BACKGROUND

Robotic machining has a very large potential market as a cost effective solution in many machining processes, such as polishing, grinding, or the like. Currently, there are mainly two methods of generating a robotic machining path, namely, manual programming (teaching) and offline programming. However, the two methods both have some drawbacks and are unable to achieve required machining performance in many scenarios.

Specifically, the offline programming method generates a machining path from an ideal workpiece model which has a size error compared with that of an actual workpiece. The manual programming method wastes a lot of time and the processing quality will be not well if it deals with a complex workpiece. Although fore control technology has been used in robot machining, for the complex workpieces, it is not easy to handle and will spend much time on programming and processing.

Therefore, it is necessary to develop a robotic machining system which is able to save program and process effort and also to eliminate size deviation between the ideal workpiece model and the actual workpiece.

SUMMARY

Example embodiments of the present disclosure propose a solution for intelligent robot machining path generation and optimization, and provide a method and an apparatus for robotic machining accordingly.

In a first aspect, example embodiments of the present disclosure provide a method for robotic machining. The method includes determining a first designed machining path based on a modeled surface for a target surface to be machined. The method also includes causing a robot to machine the target surface based on the first designed machining path in an adaptive manner to obtain an actual machining path, wherein where the modeled surface is different from the target surface, the robot is caused to follow the target surface. The method further includes determining a second designed machining path for the target surface based on the actual machining path and the first designed machining path.

In some embodiments, the robot may be run with controlled force, and causing the robot to machine may comprise: causing the robot to apply a controlled force to the target surface via a machining tool; and causing the robot to move with a constant speed.

In some embodiments, the robot may be run with controlled position, and causing the robot to machine may comprise: causing the robot to move along the first designed machining path within a predetermined position offset.

In some embodiments, determining the second designed machining path may comprise: obtaining, from the robot, feedback information concerning a position of a machining tool held by the robot and/or a force applied by the machining tool to the target surface; determining the actual machining path based on the feedback information; determining a deviation between the first designed machining path and the actual machining path; and determining the second designed machining path based on the deviation.

In some embodiments, determining the second designed machining path based on the deviation may comprise: determining, from a user input, whether the target surface is to be machined as the modeled surface or a smooth surface; in response to determining that the target surface is to be machined as the modeled surface, determining the second designed machining path by optimizing the first machining path based on the deviation; and in response to determining that the target surface is to be machined as the smooth surface, determining the second machining path as the actual machining path.

In some embodiments, the method may further comprise: causing the robot to further machine the machined target surface based on the second designed machining path.

In some embodiments, causing the robot to further machine the machined target surface based on the second designed machining path may comprise: in response to determining that a smoothness requirement for the target surface is higher than or equal to a predetermined threshold smoothness, causing the robot to further machine the machined target surface with a controlled force applied by a machining tool held by the robot to the machined target surface; and in response to determining that the smoothness requirement is lower than the predetermined threshold smoothness, causing the robot to machine the machined target surface with a controlled position of the machining tool.

In some embodiments, the method may further comprise: monitoring a machining quality of the further machined target surface; comparing the machining quality to a predetermined threshold quality; in response to the machining quality is greater than or equal to the predetermined threshold quality, ceasing the machining by the robot.

In some embodiments, determining the second designed machining path may comprise: determining whether a deviation between the first designed machining path and the actual machining path is greater than a predetermined threshold deviation; and in response to the deviation is greater than the predetermined threshold deviation, determining the second designed machining path.

In a second aspect, example embodiments of the present disclosure provide a device for robotic machining. The device comprises at least one processor and at least one memory including computer program instructions. The at least one memory and the computer program instructions are configured, with the processor, to cause the device to determine a first designed machining path based on a modeled surface for a target surface to be machined. The at least one memory and the computer program instructions are also configured, with the processor, to cause the device to cause a robot to machine the target surface based on the first designed machining path in an adaptive manner to obtain an actual machining path, wherein where the modeled surface is different from the target surface, the robot is caused to follow the target surface. The at least one memory and the computer program instructions are further configured, with the processor, to cause the device to determine a second designed machining path for the target surface based on the actual machining path and the first designed machining path.

In some embodiments, the determining unit is configured to: determine, based on the second waveform, a resonance frequency associated with the DC-link capacitor and an inductor coupled to the DC-link capacitor in the power converter; and determine, based on the resonance frequency, the parameter related to the health condition of the DC-link capacitor.

In some embodiments, the robot may be run with controlled force, and the at least one memory and the computer program instructions may further be configured, with the processor, to cause the device to: cause the robot to apply a controlled force to the target surface via a machining tool; and cause the robot to move with a constant speed.

In some embodiments, the robot may be run with controlled position, the at least one memory and the computer program instructions may further be configured, with the processor, to cause the device to: cause the robot to move along the first designed machining path within a predetermined position offset.

In some embodiments, the at least one memory and the computer program instructions may further be configured, with the processor, to cause the device to: obtain, from the robot, feedback information concerning a position of a machining tool held by the robot and/or a force applied by the machining tool to the target surface; determine the actual machining path based on the feedback information; determine a deviation between the first designed machining path and the actual machining path; and determine the second designed machining path based on the deviation.

In some embodiments, the at least one memory and the computer program instructions may further be configured, with the processor, to cause the device to: determine, from a user input, whether the target surface is to be machined as the modeled surface or a smooth surface; in response to determining that the target surface is to be machined as the modeled surface, determine the second designed machining path by optimizing the first machining path based on the deviation; and in response to determine that the target surface is to be machined as the smooth surface, determine the second machining path as the actual machining path.

In some embodiments, the at least one memory and the computer program instructions may further be configured, with the processor, to cause the device to: cause the robot to further machine the machined target surface based on the second designed machining path.

In some embodiments, the at least one memory and the computer program instructions may further be configured, with the processor, to cause the device to: in response to determining that a smoothness requirement for the target surface is higher than or equal to a predetermined threshold smoothness, cause the robot to further machine the machined target surface with a controlled force applied by a machining tool held by the robot to the machined target surface; and in response to determining that the smoothness requirement is lower than the predetermined threshold smoothness, cause the robot to machine the machined target surface with a controlled position of the machining tool.

In some embodiments, the at least one memory and the computer program instructions may further be configured, with the processor, to cause the device to: monitor a machining quality of the further machined target surface; compare the machining quality to a predetermined threshold quality; in response to the machining quality is greater than or equal to the predetermined threshold quality, cease the machining by the robot.

In some embodiments, the at least one memory and the computer program instructions may further be configured, with the processor, to cause the device to: determine whether a deviation between the first designed machining path and the actual machining path is greater than a predetermined threshold deviation; and in response to the deviation is greater than the predetermined threshold deviation, determine the second designed machining path.

In a third aspect, example embodiments of the present disclosure provide a computer readable medium having instructions stored thereon, the instructions, when executed on at least one processor, cause the at least one processor to perform the method of the first aspect.

In a fourth aspect, example embodiments of the present disclosure provide a computer program product being tangibly stored on a computer readable storage medium and comprising instructions which, when executed on at least one processor, cause the at least one processor to perform the method of the first aspect.

BRIEF DESCRIPTION OF THE DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

Throughout the drawings, the same or corresponding reference symbols refer to the same or corresponding parts.

DETAILED DESCRIPTION

The subject matter described herein will now be discussed with reference to several example embodiments. These embodiments are discussed only for the purpose of enabling those skilled persons in the art to better understand and thus implement the subject matter described herein, rather than suggesting any limitations on the scope of the subject matter.

The term "comprises" or "includes" and its variants are to be read as open terms that mean "includes, but is not limited to." The term "or" is to be read as "and/or" unless the context clearly indicates otherwise. The term "based on" is to be read as "based at least in part on." The term "being operable to" is to mean a function, an action, a motion or a state can be achieved by an operation induced by a user or an external mechanism. The term "one embodiment" and "an embodiment" are to be read as "at least one embodiment." The term "another embodiment" is to be read as "at least one other embodiment."

Unless specified or limited otherwise, the terms "mounted," "connected," "supported," and "coupled" and variations thereof are used broadly and encompass direct and indirect mountings, connections, supports, and couplings. Furthermore, "connected" and "coupled" are not restricted to physical or mechanical connections or couplings. In the description below, like reference numerals and labels are used to describe the same, similar or corresponding parts in the Figures. Other definitions, explicit and implicit, may be included below.

As mentioned above, there are mainly two methods of generating a robotic machining path, namely, manual programming (teaching) and offline programming. However, the two methods both have some drawbacks and are unable to achieve required machining performance in many scenarios.

Specifically, the offline programming method generates a machining path from an ideal workpiece model which has a size error compared with that of an actual workpiece. The manual programming method wastes a lot of time and the processing quality will be not well if it deals with a complex workpiece. Although fore control technology has been used in robot machining, for the complex workpieces, it is not easy to handle and will spend much time on programming and processing.

According to embodiments of the present disclosure, there is provided a solution for intelligent robot machining path generation and optimization. The solution combines offline path generation based on an ideal 3D model and online path optimization based on real-time data feedback. The solution obtains real-time tool position which can be used to calculate the actual workpiece size and real-time process force feedback. On the one hand, using the feedback information from a robot and other special process parameters, the solution can optimize the processing path. On the other hand, the solution can monitor the processing quality according to the feedback information from a robot. Example embodiments of the present disclosure will be described in detail below with reference to the figures.

Figure 1:
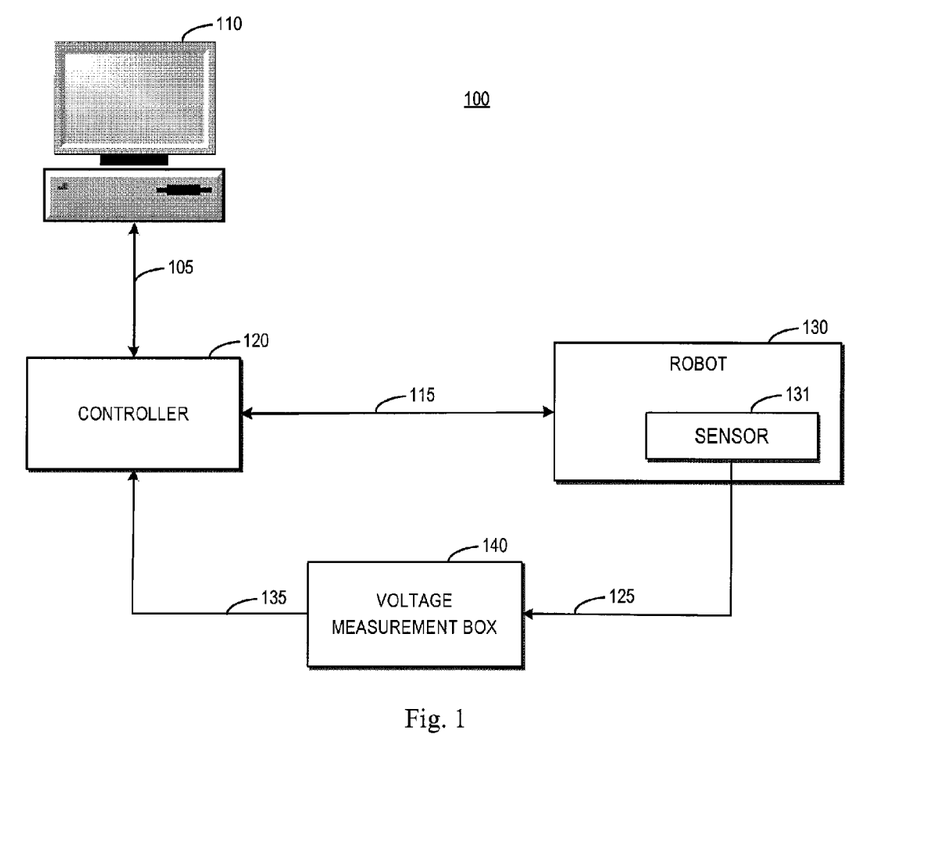
FIG. 1 illustrates a schematic diagram of a robotic machining system in which some example embodiments of the present disclosure may be implemented.

FIG. 1 illustrates a schematic diagram of a robotic machining system 100 in which some example embodiments of the present disclosure may be implemented. As shown in FIG. 1, the robotic machining system 100 may include a computer 110, a controller 120, a robot 130 controlled by the controller 120, and a voltage measurement box 140. The robot 130 may include a sensor 131, such as a force sensor, a position sensor, a distance sensor, or the like, and any combination thereof.

In operation, a user may employ the computer 110 to generate a machining path for the robot 130 to machine or process a target surface of a workpiece. The computer 110 may send the generated machining path and other user inputs to the controller 120 via a communication link 105. As an example, the communication link 105 may be an Ethernet connection, although other communication links are also possible. The controller 120 may control the robot 130 to perform the machining based on the generated machining path and other user inputs via a communication link 115, which may be a signal line, although other communication links are also possible. In some instance, the communication link 115 may also include a power line for power transmission.

Under the control of the controller 120, the robot 130 can hold a machining tool (not shown in FIG. 1) to machine, for example, polish or grind the target surface of the workpiece. In the machining, the sensor 131 of the robot 130 may collect various information related to the target surface of the workpiece, the robot 130, and the machining tool, for example, a contact force applied by the machining tool to the target surface, a position of the machining tool and/or the robot, a distance between the machining tool and/or the robot and the target surface, and/or other useful information.

The sensor 131 of the robot 130 may convert the collected information into an electrical signal, such as a voltage signal. This voltage signal may be measured by the voltage measurement box 140 via a communication link 125. The measured voltage signal may be sent to the controller 120 via a communication link 135 and then may be converted into a force and/or torque signal. The converted force and/or torque signal are sent to the computer 110 via the communication link 105. Based on the measured force and/or torque signal, the computer 110 may determine the real-time information related to the workpiece A person skilled in the art will appreciated that the electrical signal generated by the sensor 131 may also be other electrical signal than the voltage signal, such as a current signal or the like. Additionally, it is to be understood that FIG. 1 only shows several components related to the present disclosure and particular units in these components, and that the embodiments of the present disclosure are not limited thereto. In other embodiments, the robotic machining system 100 may include more or less components, different components, and different units.

Figure 2:
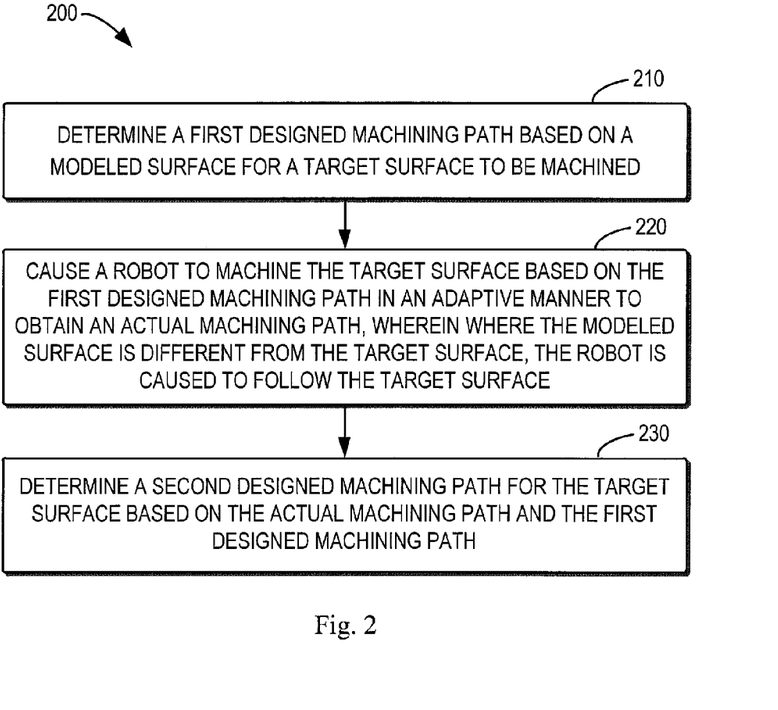
FIG. 2 illustrates a flowchart of a method for robotic machining in accordance with some example embodiments of the present disclosure.

FIG. 2 illustrates a flowchart of a method 200 for robotic machining in accordance with some example embodiments of the present disclosure. In some embodiments, the method 200 can be implemented in the computer 110 in the robotic machining system 100 as shown in FIG. 1, in order for the robot 130 performing robotic machining via the machining tool. In some other embodiments, the method 200 can also be implemented in other components or in more than one component in the robotic machining system 100.

At block 210, the computer 110 determines a first designed machining path based on a modeled surface for a target surface to be machined. For example, the target surface may belong to a workpiece to be polished or grinded, and the modeled surface may be provided by a workpiece CAD model which can be imported into the computer 110. Then, the computer 110 may send the data related to the first designed machining path to the controller 120. In response, the controller 120 may first calibrate the workpiece and the machining tool and then control the robot 130 to start the machining.

At block 220, the computer 110 causes the robot 130 to machine the target surface based on the first designed machining path in an adaptive manner to obtain an actual machining path. The adaptive manner means where the modeled surface is different from the target surface, the robot 130 is caused to follow the target surface so as to detect the actual size of the target surface.

In particular, the robot may be run with controlled force. In this event, the computer 110 may cause the robot 130 to apply a controlled force to the target surface via a machining tool and cause the robot 130 to move with a constant speed. Alternatively, the robot 130 may be run with controlled position. In this situation, the computer 110 causes the robot 130 to move along the first designed machining path within a predetermined position offset.

With this adaptive manner, the computer 110 may obtain the real-time data fed back from the controller 120. For example, the controller 120 controls the robot 130 and also measures and contains all the data related to the robot 130. Thus, the computer 110 may get data regarding actual processing path of the robot 130 from the controller 120 automatically via the communication link 115. Based on the feedback data, it is possible for the computer 110 to optimize the machining path. Alternatively, the computer 110 can monitor real-time tool position and analyze the deviation according to the feedback data, such as the tool position data, on the controller 120.

At block 230, the computer 110 determines a second designed machining path for the target surface based on the actual machining path and the first designed machining path. In other words, the first designed machining path may be optimized to obtain the second designed machining path. Through this path optimization, the computer 110 can calculate the actual workpiece size based on the real-time feedback, so as to eliminate the size deviation between the ideal workpiece model and the actual workpiece.

In particular, the computer 110 may obtain, from the robot 130, feedback information concerning a position of a machining tool held by the robot 130 and/or a force applied by the machining tool to the target surface. Also, the computer 110 may determine the actual machining path based on the feedback information. As indicated above, the robot 130 is run in the adaptive manner, so the computer 110 may detect the actual surface of the workpiece by determining the actual machining path of the robot 130. Further, based on the determined actual machining path, the computer 110 may determine a deviation between the first designed machining path and the actual machining path. Based on the deviation, the computer 110 may determine the second designed machining path, so as to generate an optimized machining path.

In this regard, there are several possible scenarios in determining the second designed machining path. In the following, reference is made to FIGS. 3 and 4 to describe how to determining the second designed machining path in these different scenarios.

Figure 3:
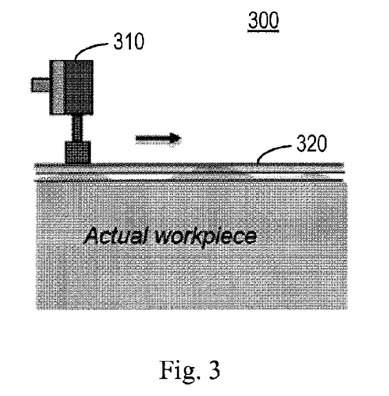
FIG. 3 illustrates a schematic diagram showing that a surface of a workpiece is to be machined as a modeled surface in accordance with some example embodiments of the present disclosure.

FIG. 3 illustrates a schematic diagram showing that the surface of the workpiece is to be machined as the modeled surface in accordance with some example embodiments of the present disclosure. As shown in FIG. 3, according to a user selection, the machining tool 310 held by the robot 130 may be controlled to machine the surface of the workpiece as the modeled surface, for example, which may be provided by the 3D model of the workpiece. In other words, the requirement for the workpiece processing size is relatively high.

Figure 4:
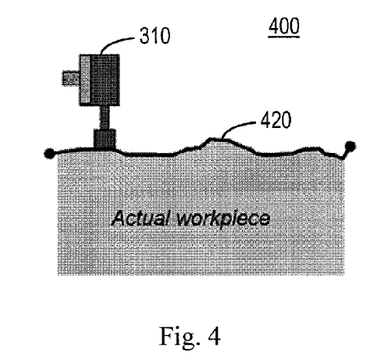
FIG. 4 illustrates a schematic diagram showing that a surface of a workpiece is to be machined as a smooth surface in accordance with some example embodiments of the present disclosure.

FIG. 4 illustrates a schematic diagram showing that the surface of the workpiece is to be machined as a smooth surface in accordance with some example embodiments of the present disclosure. As shown in FIG. 4, in contrast to the scenario depicted in FIG. 3, according to the user selection, the machining tool 310 held by the robot 130 may also be controlled to machine the surface of the workpiece as a smooth surface, rather than the modeled surface. In other words, the requirement for the workpiece processing size is relatively low.

Depending on the two different machining requirements, it may be different on how to determining the second designed machining path. Therefore, in some embodiments, before determining the second designed machining path, the computer 110 may determine from a user input whether the target surface is to be machined as the modeled surface or a smooth surface.

If the computer 110 determines that the target surface is to be machined as the modeled surface, the computer 110 may determine the second designed machining path by optimizing the first machining path based on the deviation. That is, the computer 110 may optimize the machining or processing path for getting the ideal workpiece size by calculated size deviation. In this manner, the computer 110 may iteratively optimize the machining path for the robot 130 to machine the target surface as the modeled surface.

In addition, if the computer 110 determines that the target surface is to be machined as the smooth surface, the computer 110 may determine the second machining path as the actual machining path. That is, the computer 110 may update the machining or processing path to conform to the real workpiece size. In this manner, the robot 130 can only process the target surface to be smooth instead of processing it to be the modeled surface.

In some embodiments, before determine the second designed machining path, the computer 110 may first determine whether a deviation between the first designed machining path and the actual machining path is greater than a predetermined threshold deviation, which may be set by the user according to the particular technical environment and processing requirements. If the computer 110 determines that the deviation is greater than the predetermined threshold deviation, the computer 110 may then determine the second designed machining path.

If, however, the computer 110 determines that the deviation is lower than or equal to the predetermined threshold deviation, the computer 110 may determine to complete the machining process of the robot 130 without further optimizing the first designed machining path. By this way, the robotic machining system 100 may save many operations and resources in case that the machining or processing quality achieved through the first designed machining path is acceptable.

In some embodiments, the computer 110 may cause the robot to further machine the machined target surface based on the second designed machining path. To this end, the computer 110 may first determine whether a smoothness requirement for the target surface is greater than or equal to a predetermined threshold smoothness, which may be set by the user according to the particular technical environment and processing requirements.

If the computer 110 determines that the smoothness requirement for the target surface is higher than or equal to the predetermined threshold smoothness, the computer 110 may cause the robot 130 to further machine the machined target surface with a controlled force applied by the machining tool held by the robot 130 to the machined target surface, because the robot 130 with controlled force can realize a better smoothness surface than the robot 130 with controlled position.

If the computer 110 determines that the smoothness requirement is lower than the predetermined threshold smoothness, the computer 110 may cause the robot 130 to machine the machined target surface with a controlled position of the machining tool. The robot 130 runs with controlled position may save time compared to running with controlled force. In this way, the computer 110 may determine to employ different control manner for the robot 130 to machine the target surface, so as to improving the efficiency of the whole robotic machining system 100.

In some embodiments, the computer 110 may monitor a machining quality of the further machined target surface. For example, the robot 130 may perform force monitoring or tool location monitoring through the sensor 131 and then send the monitoring information to the computer 110 via the controller 120. In particular, the computer 110 may obtain this information or data from the controller 120 when necessary. Alternatively or additionally, the controller 120 may send the information or data to the computer 110 in an update. In response, the computer 110 may determine a machining or processing quality of the machined target surface.

Further, the computer 110 may compare the machining quality to a predetermined threshold quality, which may be set by the user according to the particular technical environment and processing requirements. If the computer 110 determines that the machining quality is greater than or equal to the predetermined threshold quality, the computer 110 may cease the machining by the robot 130. In contrast, if the computer 110 determines that the machining quality is lower than the predetermined threshold quality, the computer 110 may further optimize the second designed machining path based on the feedback data provided by the robot 130.

Figure 5:
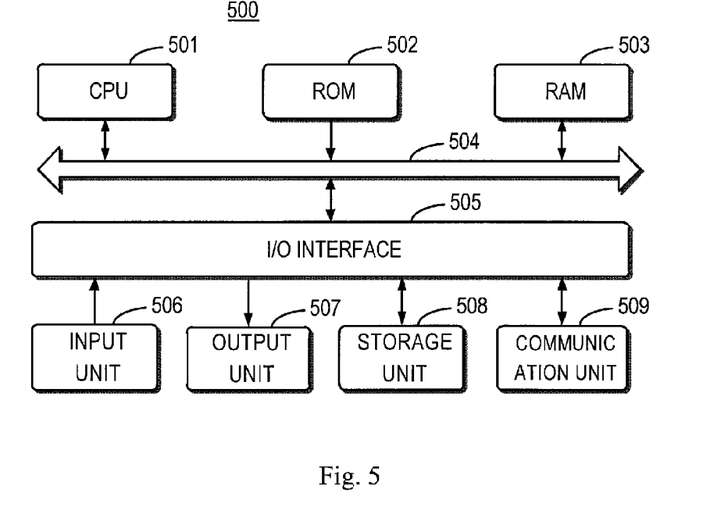
FIG. 5 illustrates a block diagram of a device that can be used to implement the example embodiments of the present disclosure.

FIG. 5 illustrates a block diagram of a device 500 that can be used to implement the example embodiments of the present disclosure. As shown in FIG. 5, the device 500 includes a Central Processing Unit (CPU) 501 which can perform various appropriate actions and processing based on computer program instructions stored in a Read Only Memory (ROM) 502 or computer program instructions uploaded from storage unit 508 to a Random Access Memory (RAM) 503. In the RAM 503, there further stores various programs and data needed by operation of the device 500. The CPU 501, ROM 502 and RAM 503 are connected one another via a bus 504. An input/output (I/O) interface 505 can also be connected to the bus 504.

A plurality of components in the device 500 are connected to the I/O interface 505, including an input unit 506, such as a keyboard, a mouse, and the like; an output unit 507, such as display of various types and loudspeakers; a storage unit 508, such as a magnetic disk and an optical disk; a communication unit 509, such as a network card, a modem, a wireless communication transceiver and so on. The communication unit 509 allows the device 500 to exchange information/data with other devices via computer networks, such as Internet, and/or various telecommunication networks.

The processes and processing described above, the method 200 for instance, can be performed by the CPU 501. For example, in some embodiments, the method 200 can be implemented as a computer software program which is corporeally contained in a machine readable medium, such as a storage unit 508. In some embodiments, the computer program can be partly or wholly loaded and/or mounted on the device 500 by the ROM 502 and/or the communication unit 509. When the computer program is uploaded to the RAM 503 and executed by the CPU 501, one or more steps of method 200 described above can be executed.

With the method and apparatus for robotic machining in accordance with the example embodiments of the present disclosure, easy force control programming may be provided for a complex workpiece, the size deviation between the ideal workpiece model and the actual workpiece may be eliminated, much programming and processing time for intelligent optimization system may be reduced, the possible workpiece deformation for the unreasonable path and process may be prevented, and the life cycle of the machining tool may also be increased.

There are many other advantages of the solution presented by the example embodiments of the present disclosure. For example, it is easy for robot force control programming and is highly automated. Specifically, the system employing the proposed method and apparatus may be a highly automated system which contains path generation, path optimization, and quality monitoring. The force control path and other path can be generated based on the 3D model. The processing path can be optimized based on the processing parameters and controller feedback data. Moreover, it can achieve increased processing quality and low time cost and may also be easy for application engineer's use.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIG. 2. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for robotic machining, comprising:
   determining a first designed machining path based on a modeled surface for a target surface to be machined;
   causing a robot to machine the target surface based on the first designed machining path in an adaptive manner to obtain an actual machining path, wherein where the modeled surface is different from the target surface, the robot is caused to follow the target surface; and
   determining a second designed machining path for the target surface based on the actual machining path and the first designed machining path.

2. The method of claim 1, wherein the robot is run with controlled force, and causing the robot to machine comprises:
   causing the robot to apply a controlled force to the target surface via a machining tool; and
   causing the robot to move with a constant speed.

3. The method of claim 1, wherein the robot is run with controlled position, and causing the robot to machine comprises:
   causing the robot to move along the first designed machining path within a predetermined position offset.

4. The method of claim 1, wherein determining the second designed machining path comprises:
   obtaining, from the robot, feedback information concerning a position of a machining tool held by the robot and/or a force applied by the machining tool to the target surface;
   determining the actual machining path based on the feedback information;
   determining a deviation between the first designed machining path and the actual machining path; and
   determining the second designed machining path based on the deviation.

5. The method of claim 4, wherein determining the second designed machining path based on the deviation comprises:
   determining, from a user input, whether the target surface is to be machined as the modeled surface or a smooth surface;
   in response to determining that the target surface is to be machined as the modeled surface, determining the second designed machining path by optimizing the first machining path based on the deviation; and
   in response to determining that the target surface is to be machined as the smooth surface, determining the second machining path as the actual machining path.

6. The method of claim 1, further comprising:
   causing the robot to further machine the machined target surface based on the second designed machining path.

7. The method of claim 6, wherein causing the robot to further machine the machined target surface based on the second designed machining path comprises:
   in response to determining that a smoothness requirement for the target surface is greater than or equal to a predetermined threshold smoothness, causing the robot to further machine the machined target surface with a controlled force applied by a machining tool held by the robot to the machined target surface; and
   in response to determining that the smoothness requirement is lower than the predetermined threshold smoothness, causing the robot to machine the machined target surface with a controlled position of the machining tool.

8. The method of claim 6, further comprising:
   monitoring a machining quality of the further machined target surface;
   comparing the machining quality to a predetermined threshold quality; and
   in response to the machining quality is greater than or equal to the predetermined threshold quality, ceasing the machining by the robot.

9. The method of claim 1, wherein determining the second designed machining path comprises:
   determining whether a deviation between the first designed machining path and the actual machining path is greater than a predetermined threshold deviation; and
   in response to the deviation is greater than the predetermined threshold deviation, determining the second designed machining path.

10. A device for robotic machining, comprising:
    at least one processor, and
    at least one memory including computer program instructions, the at least one memory and the computer program instructions configured, with the processor, to cause the device to:
    determine a first designed machining path based on a modeled surface for a target surface to be machined;
    cause a robot to machine the target surface based on the first designed machining path in an adaptive manner to obtain an actual machining path, wherein where the modeled surface is different from the target surface, the robot is caused to follow the target surface; and
    determine a second designed machining path for the target surface based on the actual machining path and the first designed machining path.

11. The device of claim 10, wherein the robot is run with controlled force, and the at least one memory and the computer program instructions are further configured, with the processor, to cause the device to:
    cause the robot to apply a controlled force to the target surface via a machining tool; and
    cause the robot to move with a constant speed.

12. The device of claim 10, wherein the robot is run with controlled position, the at least one memory and the computer program instructions are further configured, with the processor, to cause the device to:
    cause the robot to move along the first designed machining path within a predetermined position offset.

13. The device of claim 10, wherein the at least one memory and the computer program instructions are further configured, with the processor, to cause the device to:
    obtain, from the robot, feedback information concerning a position of a machining tool held by the robot and/or a force applied by the machining tool to the target surface;
    determine the actual machining path based on the feedback information;
    determine a deviation between the first designed machining path and the actual machining path; and
    determine the second designed machining path based on the deviation.

14. The device of claim 13, wherein the at least one memory and the computer program instructions are further configured, with the processor, to cause the device to:
- determine, from a user input, whether the target surface is to be machined as the modeled surface or a smooth surface;
- in response to determining that the target surface is to be machined as the modeled surface, determine the second designed machining path by optimizing the first machining path based on the deviation; and
- in response to determine that the target surface is to be machined as the smooth surface, determine the second machining path as the actual machining path.

15. The device of claim 10, wherein the at least one memory and the computer program instructions are further configured, with the processor, to cause the device to:
- cause the robot to further machine the machined target surface based on the second designed machining path.

16. The device of claim 15, wherein the at least one memory and the computer program instructions are further configured, with the processor, to cause the device to:
- in response to determining that a smoothness requirement for the target surface is greater than or equal to a predetermined threshold smoothness, cause the robot to further machine the machined target surface with a controlled force applied by a machining tool held by the robot to the machined target surface; and
- in response to determining that the smoothness requirement is lower than the predetermined threshold smoothness, cause the robot to machine the machined target surface with a controlled position of the machining tool.

17. The device of claim 15, wherein the at least one memory and the computer program instructions are further configured, with the processor, to cause the device to:
- monitor a machining quality of the further machined target surface;
- compare the machining quality to a predetermined threshold quality; and
- in response to the machining quality is greater than or equal to the predetermined threshold quality, cause the machining by the robot.

18. The device of claim 10, wherein the at least one memory and the computer program instructions are further configured, with the processor, to cause the device to:
- determine whether a deviation between the first designed machining path and the actual machining path is greater than a predetermined threshold deviation; and
- in response to the deviation is greater than the predetermined threshold deviation, determine the second designed machining path.

19. A non-transitory computer readable medium, comprising:
- the computer readable medium having instructions stored thereon, the instructions, when executed on at least one processor, cause the at least one processor to implement robotic machining, comprising:
- determine a first designed machining path based on a surface for a target surface to be machined;
- cause a robot to machine the target surface based on the first designed machining path in an adaptive manner to obtain an actual machining path, wherein where the modeled surface is different from the target surface, the robot is caused to follow the target surface; and
- determine a second designed machining path for the target surface based on the actual machining path and the first designed machining path.

20. A computer program product, comprising:
- the computer program product being tangibly stored on a computer readable storage medium and comprising instructions which, when executed on at least one processor, cause the at least one processor to;
- determine a first designed machining path based on a modeled surface for a target surface to be machined;
- cause a robot to machine the target surface based on the first designed machining path in an adaptive manner to obtain an actual machining path, wherein where the modeled surface is different from the target surface, the robot is caused to follow the target surface; and
- determine a second designed machining path for the target surface based on the actual machining path and the first designed machining path.

* * * * *